Nov. 6, 1962     A. PITNER     3,062,026
PROCESS AND DEVICE FOR MOUNTING NEEDLE
BEARINGS IN UNIVERSAL JOINTS
Filed Aug. 2, 1960

United States Patent Office 3,062,026
Patented Nov. 6, 1962

3,062,026
PROCESS AND DEVICE FOR MOUNTING NEEDLE BEARINGS IN UNIVERSAL JOINTS
Alfred Pitner, Paris, France, assignor to Societe Anonyme des Roulements a Aiguilles, Rueil-Malmaison, France, a French body corporate
Filed Aug. 2, 1960, Ser. No. 47,034
Claims priority, application France Oct. 21, 1959
9 Claims. (Cl. 64—17)

The present invention is to provide a process and a device for mounting needle bearings in universal joints, and more specifically in universal joints of the crosshead type.

Generally, this mounting is effected by cupping each trunnion of the crosshead with a needle row held by a hardened-surface cup having an outwardly-directed bottom portion adapted to retain the needles; at the same time, this bottom is used to center the crosshead relative to the yoke or jaw of the universal joint, in that the end of the trunnion is bearing against said bottom, while the sleeve is retained at the desired axial location within the receiving bore provided in the jaw or yoke, usually by means of a resilient split ring engageable into a groove in the bore, or other means requiring additional machining operations.

In universal joints for motor vehicle transmission, or other joints interconnecting non-aligned shafts rotating at a high speed, it is essential that the centering of the crosshead should be more accurate and affords a minimum clearance, since the least eccentricity leads to unbalancing and to objectionable vibrating.

The machining tolerances of the grooves, the split-ring thickness tolerances, those of the allowed distance between the trunnion ends remote from the crosshead and finally those of the cup bottom thickness are actually added to one another and may result either in excessive clearances or in heat and wear-generating strains.

The process provided by the invention, which enables a much higher accuracy to be achieved in the mounting comprises positioning, in the coaxial bores of the female member, the aligned pivots or trunnions and the needle-carrying cups surrounding the same and, while maintaining the rotational axes of the trunnion-carrying member and the female member in accurate alignment, pressing the cup bottoms into engagement with the trunnion ends, by a sliding motion of said cups, induced by any suitable means with interposition of a retaining member bearing against the bottom of the corresponding cup, the edges of this retaining member having a tool-like conformation, so that, once the member has been brought to the required location, the tool is actuated so as to cut, in the bore wall of the respective members, a recess and/or a projection making it self-supporting.

This means eliminates any pre-machining of the bore and provides nevertheless an accurate and sufficiently strong bond to withstand the centrifugal axial stresses during operation. It will be appreciated that the retaining member thus acts both as an abutment member for the cup and as a tool adapted to cut the means ensuring its self-sustainment in the bore.

Amongst the various possible solutions, enabling a retaining member to play the part of such a tool, the simpler ones comprise for instance the case where the tool is a tap and that where the tool is a chisel; in either case, the working edges of the tool have to be of a harder material than the metal forming the walls of the bore.

Accordingly, the retaining member may comprise at the periphery thereof, a screwthread so as to tap the bore by screwably inserting said member in the bore until it abuts the cup.

It may further have an inherent resiliency or be radially expandable, and comprise at the periphery hereof, a cutting tool so directed that the insertion is effected slidably along the bore, but any possibility of receding being prevented owing to the radial expansion occurring simultaneously with the cutting tool penetration into the wall metal, the whole unit operating in this case as would have done a ratchet braced against a rack element cut by the retaining member itself.

These various possibilities are diagrammatically illustrated in the accompanying drawing, in which.

Figure 6:
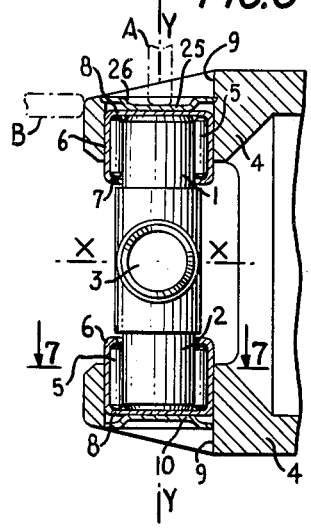
FIG. 6 is an axial sectional view of a jaw or yoke of a universal joint, showing two trunnions of a crosshead and interposed needle bearings.

With particular reference to FIG. 6 of the drawing, numerals 1 and 2 indicate two trunnions of a crosshead 3 which is to be mounted in the jaw 4 of the universal joint. Each trunnion is surrounded by a row of needles 5, held within a cup 6 having inwardly thereof a flange 7 and outwardly thereof a bottom portion 8 for locating the needles.

In a conventional mounting, the cups 6 are axially located by means of a split ring, positioned in a groove provided in the bore 9 of the jaw 4 and adapted to hold the cups in an accurate axial location.

In order to ensure a correct behaviour of a high-speed operating universal joint, the rotational axis XX of the crosshead must be very accurately aligned with that of the jaw (when these members are at a zero angle in relation to each other, as is obvious), since any eccentricity would result in objectionable vibrations. Moreover, the axial clearance, along YY, intermediate the end of each trunnion and the corresponding cup bottom 8, bearing against the retaining ring, has to be a minimum, without generating however any strains which would jeopardize the good behaviour of the universal joint. As has already been stated, it is actually obvious that the precision of the mounting is conditioned by that of the groove and cup machining etc. and since several clearances are cumulatively added to one another, this precision is the harder to achieve and the machining costs are substantially increased.

The process forming the subject matter of this invention overcomes the aforesaid drawbacks. It comprises positioning in the coaxial bores 9 of the jaw, the crosshead and the needle-carrying cups 6 and, while keeping the rotational axes of the crosshead and the jaw in strict alignment (axis XX), by means of a suitable mounting, pressing the bottoms 8 of cups 6 into engagement with the ends of the trunnions, by causing the sleeves to slide within the respective bore 9, with interposition of a retaining member 25, which bears against said corresponding bottom and is held in this position within said bore. In case it is desired to provide controlled clearance between the retaining members 25 and the cups 6, the yoke of the universal joint is resiliently deformed so as to establish a selected axial distance between the bores before the retaining members are pressed into place. After the cups and retaining members are secured in position in the bore, the yoke is released and returns to its original form, thereby providing a selected clearance as desired.

Figure 1:
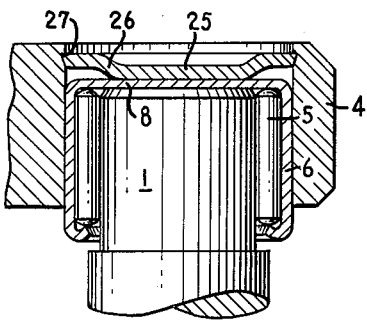
FIG. 1 is a sectional view illustrating a retaining member providing the combination of a cutting chisel and a retaining ratchet.

In the embodiment illustrated in FIG. 1, the retaining member 25 has inherent resiliency due to the camber causing the annular portion to be bodily shifted, the periphery of said annular portion forming a kind of chisel 27. Its orientation and its deflection are such that the member 25 can be driven-in until contacting the cup 6, and until the latter comes to bear against the trunnion, by sliding in the bore, whereas it cannot recede owing to the penetration of the chisel 27 into the wall metal.

Figure 3:
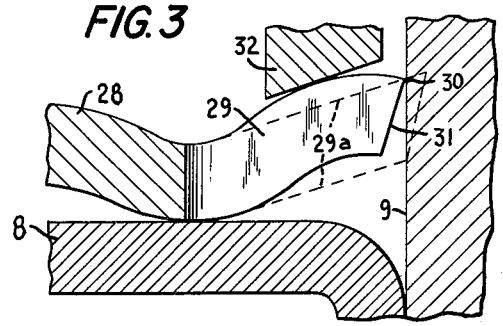
FIG. 3 is an enlarged sectional fragmentary view illustrating a modification of the embodiment shown in FIG. 1.
Figure 4:
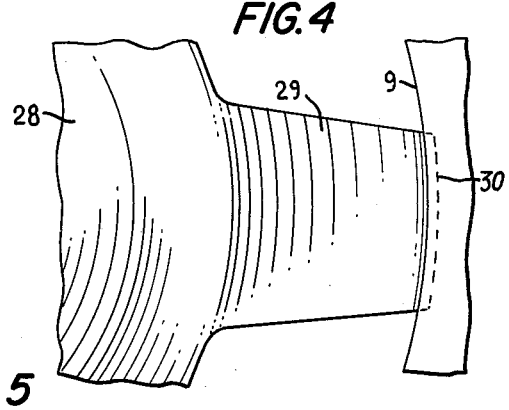
FIG. 4 is the corresponding plan view.
Figure 7:
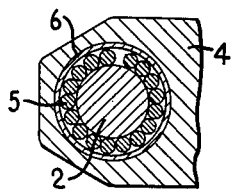
FIG. 7 is a cross-section along line 7—7 of FIG. 6.

The shape of this chisel will be better seen in FIG. 3, in which there is additionally shown a modification embodying a star-shaped or crenelated retaining member 28, each branch 29 of this "star" being counter-set and ending with a chisel edge 30 defined by the intersection of the outer surface of the retaining member and a peripheral edge surface 31. The retaining member is driven home by means of a tool 32, operated by a press or by percussion and whose shape is such that when engaging the limit stop, it produces a deformation of rectification of the branches 29, resulting in a radial expansion and the penetration of the chisel 30 into the wall 9 of the bore.

Figure 2:
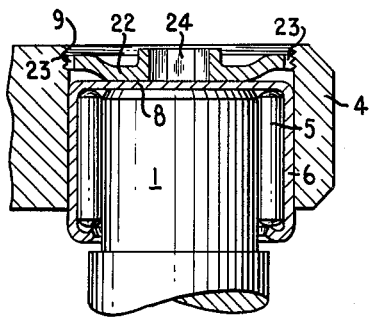
FIG. 2 is a similar sectional view showing a self-tapping retaining member.

Referring to the modification of FIG. 2, the retaining member 22 has on the periphery thereof a screw-thread which is of a harder material than the metal of bore 9 and in the center thereof, a square, hexagonal or similarly-shaped opening, engageable by a rotary wrench. In order to facilitate the cutting of a tap-thread by the retaining member, the latter preferably includes, as does a tapping tool, receded notches 23 separating the threaded sectors.

To effect the mounting the member 22 is rotated and cuts a tap-thread so that it is moved along the bore until stoped by the bottom 8 of the cup member, which is in turn abutting the trunnion.

Figure 5:
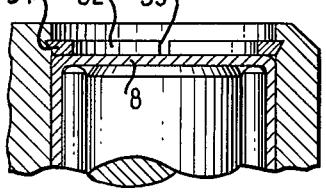
FIG. 5 is a sectional view of a resilient split ring having the same purpose.

In FIG. 5, the retaining member is comprised by a resilient ring, split at 33 and the periphery of which provides a circular chisel 34. The radial expansion after insertion is in this case upheld by the inherent resiliency of the elastic ring.

Since the retaining member has to play the part of a cutting tool, it is advantageous to reduce the circumferential extent of the working edge of the tool (tap or chisel), so as to increase the unitary pressure under a given stress and facilitate the cutting or the insetting of the metal forming the retaining member into the wall of the bore.

It is further preferred to have the member counterset, such that the mechanical effect, as shown in FIG. 3, produces a maximum radial component for a limited axial stress exerted by the tool 32.

Having described my invention what I claim as new and desire to secure by Letters Patent is:

1. A process of mounting needle bearings to be interposed between two aligned trunnions of the cross head of a universal joint and the bores of the corresponding yoke member of said universal joint, which comprises inserting within said bores the respective trunnion and a cup member holding the bearing needles around said trunnion, keeping the axes of rotation of said cross head and said yoke member in accurate alignment, inserting through the open outer end of each bore a retaining member having sharp edge portions adapted to cut retaining recesses in the inner wall of said bore, and forcing said retaining member into an operative position where it bears against the outer portion of said cup member and cuts retaining recesses in the inner wall of said bore, whereby said retaining member is clamped in said operative position by the cooperation of the edge portions of said retaining member with the recesses cut in the wall of said bore.

2. A process of mounting needle bearings to be interposed between two aligned trunnions of the cross head of a universal joint and the bores of the corresponding yoke member of said universal joint, which comprises inserting within said bores the respective trunnion and a cup member holding the bearing needles around said trunnion keeping the axes of rotation of said cross head and said yoke member in accurate alignment, inserting through the open outer end of each bore a retaining member having a non-rectilinear profile and edge portions harder than the material of the corresponding bore of the yoke member engaging the inner wall thereof, pressing said retaining member against the outer portion of said cup, and deforming said retaining member to cause the edge portions thereof to cut retaining recesses in the inner wall of said bore and remain engaged in said recesses to retain said retaining member in said pressed position.

3. A process of mounting needle bearings to be interposed between two aligned trunnions of the cross head of a universal joint and cylindrical bores of the corresponding yoke member of said universal joint, which comprises inserting within said bores the respective trunnion and a cup member holding the bearing needles around said trunnion, keeping the axes of rotation of said cross head and said yoke member in accurate alignment, inserting through the open outer end of each bore a retaining member having a discontinuous screw-tap edge formation adapted to cut a screw-thread in the cylindrical inner wall of said bore and screwing said retaining member into an operative position where said member bears against the outer portion of said cup member and simultaneously cutting threads in the inner wall of said bore.

4. A process of mounting needle bearings to be interposed between two aligned trunnions of the cross head of a universal joint and the cylindrical bores of the corresponding yoke member of said universal joint, which comprises inserting within said bores the respective trunnion and a cup member holding the bearing needles around said trunnion, keeping the axes of rotation of said cross head and said yoke member in accurate alignment, inserting through the open outer end of each bore a retaining member having sharp edge portions adapted to cut retaining recesses in the inner wall of said bore, resiliently deforming said yoke member so as to establish a selected axial distance between said bores, forcing said retaining member into an operative position where it bears against the outer portion of said cup member and forcing said sharp edges into the cylindrical inner wall of said bore to cut recesses therein, whereby said retaining member is clamped in said operative position by the cooperation of said sharp edge of said retaining member with said recesses cut in the inner wall of said bore and releasing said yoke from the resilient deformation so as to provide a selected clearance between said trunnions and said cup members.

5. In a universal joint comprising a cross head and a yoke having two aligned cylindrical bores for receiving two aligned trunnions of said cross head, a circular row of bearing needles engaging each trunnion, a cup member holding said needles in place and having a circular sleeve portion engaging the inner wall of the corresponding bore and an outer transverse portion engaging the outer end of the respective trunnion and a retaining member wholly received in said bore and having a transverse portion supporting said cup member against axial displacement and a peripheral portion extending radially outwardly from said transverse portion and having a sharp peripheral edge which is harder than the inner surface portion of said bore, said retaining member in installed condition having a diameter greater than the diameter of said bore whereby said hard sharp peripheral edge cuts into the cylindrical inner surface of said bore to anchor said retaining member securely in said bore and thereby retain said cup member in place.

6. In a universal joint comprising a cross head and a yoke having two aligned cylindrical bores for receiving two aligned trunnions of said cross head, a circular row of bearing needles engaging each trunnion, a cup member holding said needles in place and having a circular sleeve portion engaging the inner wall of the corresponding bore and an outer transverse portion engaging the outer end of the respective trunnion and a retaining member wholly received in said bore and having a transverse portion supporting said cup member against axial displacement and a peripheral portion extending radially and axially outwardly from said transverse portion and having a sharp discontinuous peripheral edge which is harder than the inner surface portion of said bore and shaped to constitute a tapping die having an outside diameter greater than the diameter of said bore, said retaining member being screwed into said cylindrical bore to a position in which said transverse portion supports said cup and thereby tapping threads in said bore, the inner surface of said bore being smooth and cylindrical except for the tapping by said retaining member.

7. In a universal joint comprising a cross head and a yoke having two aligned cylindrical bores for receiving two aligned trunnions of said cross head, a circular row of bearing needles engaging each trunnion, a cup member holding said needles in place and having a circular sleeve portion engaging the inner wall of the corresponding bore and an outer transverse portion engaging the outer end of the respective trunnion and a retaining member wholly received in said bore and having an inner portion supporting said cup member against axial displacement and a discontinuous peripheral portion extending radially outwardly from said inner portion and having a sharp peripheral edge which is harder than the inner surface portion of said bore, said retaining member in installed condition being pressed axially in against said cup member and expanded radially whereby said hard sharp edge cuts into the cylindrical inner surface of said bore to anchor said retaining member securely in said bore and thereby retain said cup member in place.

8. A universal joint as claimed in claim 7, wherein said retaining member has an inwardly dished star shape, whereby an axial thrust thereon by said cup member causes a radial expansion of the hard and sharp edges of the branches of said star.

9. A universal joint as claimed in claim 7, wherein said retaining member has the shape of an elastic split ring having a hard and sharp edge which cuts a groove in the wall of said bore when said split ring is expanded radially.

References Cited in the file of this patent
UNITED STATES PATENTS
2,078,739    Slaght _____ Apr. 27, 1937

FOREIGN PATENTS
826,529    Germany _____ Jan. 3, 1952

UNITED STATES PATENT OFFICE
CERTIFICATE OF CORRECTION

Patent No. 3,062,026                                        November 6, 1962

Alfred Pitner

It is hereby certified that error appears in the above numbered patent requiring correction and that the said Letters Patent should read as corrected below.

In the grant, lines 1 to 3, for "assignor to Societe Anonyme des Roulements a Aiguilles, of Rueil-Malmaison, France, a French body corporate," read -- assignor of one-half to Societe Anonyme des Roulements a Aiguilles, of Rueil-Malmaison, France, a French body corporate, --; line 12, for "Societe Anonyme des Roulements a Aiguilles, its successors" read -- Alfred Pitner, his heirs or assigns, and Societe Anonyme des Roulements a Aiguilles, its successors --; and in the heading to the printed specification, lines 4 to 6, for "assignor to Societe Anonyme des Roulements a Aiguilles, Rueil-Malmaison, France, a French body corporate" read -- assignor of one-half to Societe Anonyme des Roulements a Aiguilles, Rueil-Malmaison, France, a French body corporate --.

Signed and sealed this 29th day of October 1963.

(SEAL)
Attest:
ERNEST W. SWIDER
Attesting Officer

EDWIN L. REYNOLDS
Acting Commissioner of Patents